United States Patent [19]

Spatolisano et al.

[11] Patent Number: 5,685,131
[45] Date of Patent: Nov. 11, 1997

[54] HEAT SEALING DEVICE

[75] Inventors: Francesco Spatolisano, Pavarolo; Mario Delsanto, Feletto, both of Italy

[73] Assignee: Hitech Systems S.r.l., Leini', Italy

[21] Appl. No.: 616,837

[22] Filed: Mar. 15, 1996

[30] Foreign Application Priority Data

Mar. 21, 1995 [IT] Italy ................ TO95A0211

[51] Int. Cl.⁶ ........................................... B65B 9/06
[52] U.S. Cl. ...................... 53/550; 53/373.7; 53/374.4; 53/374.5; 53/374.6
[58] Field of Search ................ 53/550, 551, 552, 53/553, 554, 555, 373.7, 374.4, 374.5, 374.6

[56] References Cited

U.S. PATENT DOCUMENTS

| 4,949,846 | 8/1990 | Lakey. | |
|---|---|---|---|
| 5,001,891 | 3/1991 | Abate | 53/373.7 |
| 5,131,213 | 7/1992 | Shanklin et al. | 53/373.7 |
| 5,279,098 | 1/1994 | Fukuda | 53/551 |
| 5,347,795 | 9/1994 | Fukuda | 53/552 |
| 5,584,166 | 12/1996 | Lakey | 53/374.5 |

FOREIGN PATENT DOCUMENTS

| 0133558 | 2/1985 | European Pat. Off. . |
|---|---|---|
| 0469819 | 2/1992 | European Pat. Off. . |
| 3715146 | 12/1988 | Germany . |
| 1320212 | 6/1973 | United Kingdom . |
| 2224714 | 5/1990 | United Kingdom . |
| 8802334 | 4/1988 | WIPO . |
| 9013487 | 11/1990 | WIPO . |

OTHER PUBLICATIONS

Patent Abstracts of Japan vol. 16, No. 311 (M–1277), 8 Jul. 1992 & JP-A-04 087931 (Fukuda Masao), 19 Mar. 1992, *abstract*.

Patent Abstracts of Japan vol. 17, No. 403 (M–1453), 28 Jul. 1993 & JP-A-05 077805 (Ishida Scales Mfg Co Ltd), 30 Mar. 1993, *abstract*.

Patent Abstracts of Japan vol. 18, No. 56 (M–1551), 28 Jan. 1994 & JP-A-05 278729 (Ishida Scales Mfg Co Ltd), 26 Oct. 1993 *abstract*.

Primary Examiner—John Sipos
Assistant Examiner—Gene L. Kim
Attorney, Agent, or Firm—Guido Modiano; Albert Josif

[57] ABSTRACT

Heat-sealing device including mutually opposite active heads that are associated with respective counter-rotating driving shafts and are subjected to the action of cam elements that move the heads along a path that is partially parallel to a continuous tubular container that includes the products to be packaged. The oppositely arranged active heads, during the rotation of the respective counter-rotating driving shafts, move mutually closer to clamp the tubular container in the region that separates one product from the other and to perform the heat-sealing of that region and the cutting of the container that separates each package from the adjacent one. A planetary-gear system is interposed between the active heads and the corresponding driving shaft to make the individual heads, during the rotation of the driving shaft, perform a revolving motion that keeps them parallel to themselves, and to cause the mutual approach of the mutually opposite heads in a mutually parallel relationship along an approach path that is substantially perpendicular to the tubular container.

9 Claims, 6 Drawing Sheets

HEAT SEALING DEVICE

BACKGROUND OF THE INVENTION

The present invention relates to a device for the continuous heat sealing of packaging containers made of heat-sealable polymeric material and to heat-sealing machines including said device.

It is known that many products, especially food products, are individually prepackaged in containers made of polymeric material that have the purpose of preserving their original qualities, for example the organoleptic qualities in the case of food products, for a long time and to protect them from dust and other external factors in the subsequent handling to which such products are subjected in the interval between production and distribution to the public.

For this purpose, it is known to protect the individual products with respective hermetic containers, forming such containers starting from a sheet of continuous heat-sealable polymeric material that is folded to form a likewise continuous tubular container; the products are wrapped by using this tubular container and the individual packages of each product are separated by means of the heat-sealing and cutting of the tubular container portion comprised between one product and the next.

This packaging method uses machines that comprise a horizontal conveyor belt for carrying the individual products, which are fed continuously with an appropriate mutual spacing interval; at the end of the belt there is a heat-sealing and cutting device, which comprises oppositely arranged active heads that are capable of clamping the continuous tubular container in the regions that separate one product from the next and of providing the heat-seal and cut that separate each individual package from the adjacent one. The same processing technology is also used for the packaging of sealed doses of powdered products, but with the difference that machines are used in which the continuous tubular container moves along a vertical path. In these vertical machines, the oppositely arranged active heads initially form, by means of a first heat-sealing operation, the bottom of each pouch-like package, into which the dose of powdered product to be packaged is fed by gravity by means of a controlled hopper, then the heads close the pouch with a second heat-sealing operation, simultaneously separating the completed package by cutting.

In older conventional machines, the active heads of the heat-sealing device are directly associated in mutually opposite pairs with respective counter-rotating shafts and engage the continuous tubular container along a narrow portion that corresponds to the mutual tangent contact of each head with the opposite one produced by the rotation of the respective shafts. Typically, in these machines the tangent contact of the opposite active heads covers an arc of 8°–10° over the 360° of the rotation of the supporting shafts of the heads and can be largely inadequate to provide correct heat-sealing of the ends of each container, especially if the container is obtained starting from a sheet of substantial thickness and especially in vertical machines for packaging powdered products.

In order to obviate this drawback, in more recently manufactured conventional machines, the opposite active heads of the heat-sealing device are supported by the respective rotating shaft, with the interposition of a slider-based retention system that allows them to move radially, and are controlled by at least one fixed actuation cam that is provided with a straight portion that runs parallel to the path of the continuous tubular container.

A construction of this type, related to a machine in which the path of the continuous tubular container is horizontal, is described in Italian patent no. 958,037, incorporated herein by reference.

In this conventional machine, the active heads of the heat-sealing device are supported by respective cross-members that are guided radially by fork-like plates that are rigidly coupled to the corresponding rotating shaft, and the cross-members are provided with tip rollers that engage in the cam-like slots of a pair of fixed plates; the slots are formed by a circular portion, which is concentric to the rotating shaft, and by a straight portion, which is parallel to the path of the continuous tubular container.

At the straight portion of the cams, the opposite active heads undergo a greater rotation that arranges them so that they face each other in a configuration for engaging the continuous tubular container by clamping, and they remain in this configuration over the entire extension of the straight portion that corresponds to an arc of approximately 30°–35°. The contact of the pair of opposite active heads with the material of the tube is thus extended to affect the entire active surface of the heads and is correspondingly extended in space and in time (rotation rates of the head supporting shafts being equal), and this facilitates heat-sealing and improves the production process.

However, at the beginning of the straight path, the opposite heads of each pair move closer to each other and roll on each other, and this causes that initial contact occurs along a single generatrix of the active surface of the heads.

In machines with a horizontal path, this initial contact, which is localized on a single generatrix, produces a high concentration of the clamping forces that can also cause tearing of the continuous tubular container, and in vertical machines such localized initial contact prevents the correct heat-sealing of the bottom of the pouch-like package because the powdered material penetrates between the facing surfaces of the tubular container, preventing heat-sealing.

An attempt has been made to obviate this drawback by subjecting the active heads of the heat-sealing device to the action of pairs of cams that are identical but offset and are capable of producing the mutual rotation of the heads before they make mutual contact.

A device of this type is described in the prior European Patent no. 0 226 693, also incorporated herein by reference, in combination with a vertical sealing machine. However, this conventional device has not produced fully satisfactory results, essentially because of its considerable structural complexity, which limits its operating speed, significantly reducing the yield of the machine on which it is installed; accordingly, its adoption, which is acceptable for vertical machines, is not adapted on horizontal ones, which are significantly faster than vertical ones.

Furthermore, this conventional device has a considerable space occupation, which does not allow to associate more than two active heads with each counter-rotating shaft, thus keeping the yield of the device within low limits.

SUMMARY OF THE INVENTION

An aim of the present invention according to one preferred aspect is essentially to eliminate these and other drawbacks of conventional devices, and within the scope of this general aim, the invention has the important object of providing a device for the continuous heat-sealing of containers made of polymeric material that is capable of ensuring that the mutual approach of the active heads occurs without mutual rotations and substantially with straight translatory motions of the heads along approach paths that are perpendicular to the path of the continuous tubular container.

Another important object of the present invention is to provide a very simple device that allows high operating speeds, so that its adoption is equally advantageous on vertical heat-sealing machines and on horizontal ones.

In particular, an object of the invention is to provide a device having minimal space occupation that allows to associate even four active heads with each rotating shaft, thus doubling the yield of the machine at a same rotation rate of said shafts.

Another important object of the invention is to provide a device in which contact between the opposite heads can be extended to the entire active surface of the heads starting from the moment of initial contact, so as to avoid the onset of localized tensions and so as to allow, in vertical machines, the correct heat-sealing of the container portions that form the bottom of each pouch-like package.

Substantially, the invention according to one preferred but not exclusive embodiment is based on the concept of interposing a planetary-gear system between each active head and the corresponding rotating supporting shaft, so that the heads revolve about the axis of the respective shaft and remain parallel to themselves. With this arrangement, the heads of the opposite pairs—in accordance with the stated aim and objects—move mutually closer in a mutually parallel relationship along an approach path that is substantially perpendicular to the direction of the path of the continuous tubular container.

BRIEF DESCRIPTION OF THE DRAWINGS

The characteristics, purposes, and advantages of the device according to the invention will become apparent from the following detailed description and with reference to the accompanying drawings, given by way of non-limitative example, wherein.

DESCRIPTION OF THE PREFERRED EMBODIMENTS

Figure 1:
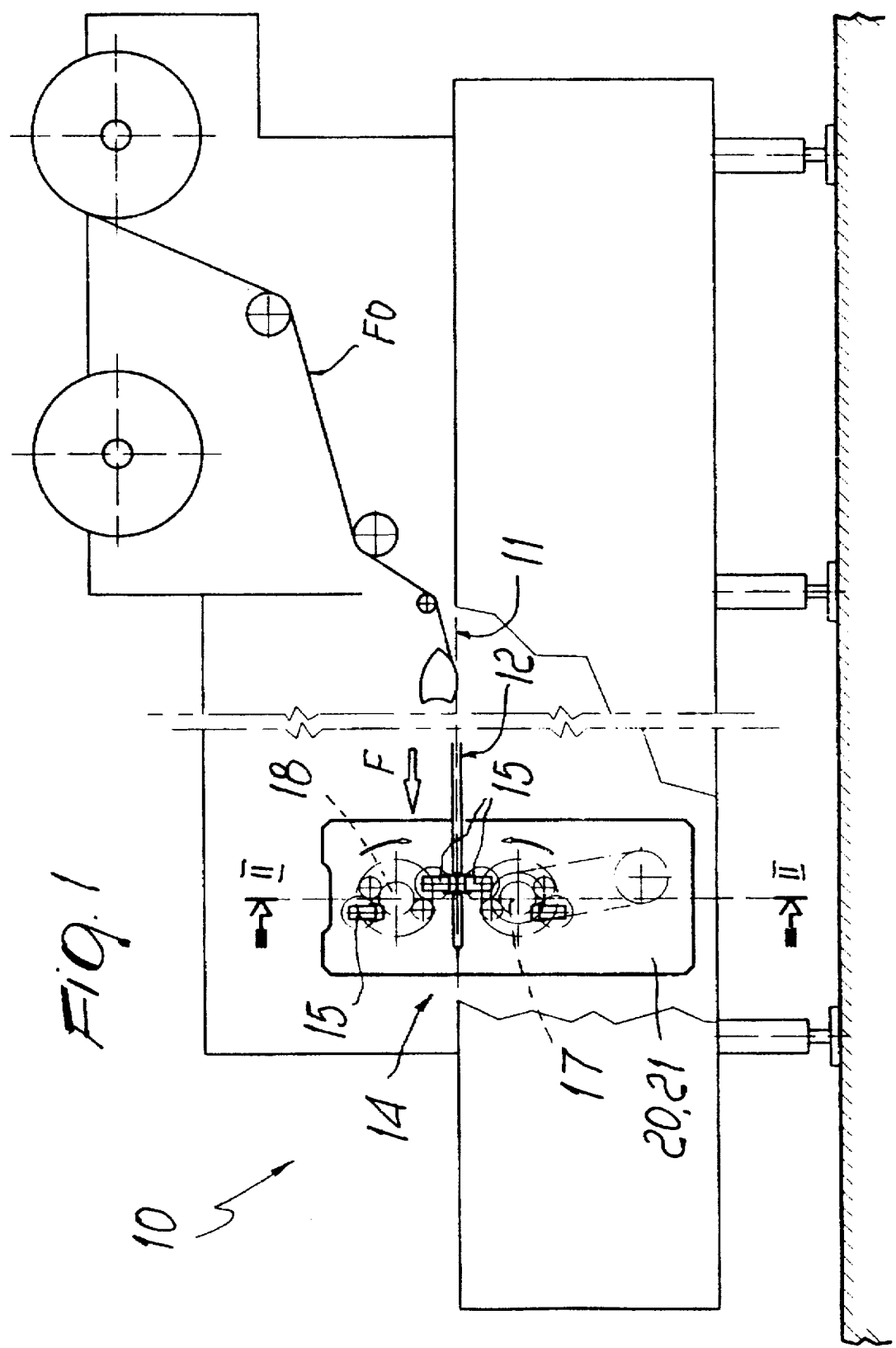
FIG. 1 is a schematic lateral elevation view of a heat-sealing machine having a horizontal path, with the heat-sealing and cutting device according to one preferred aspect of the invention.
Figure 2:
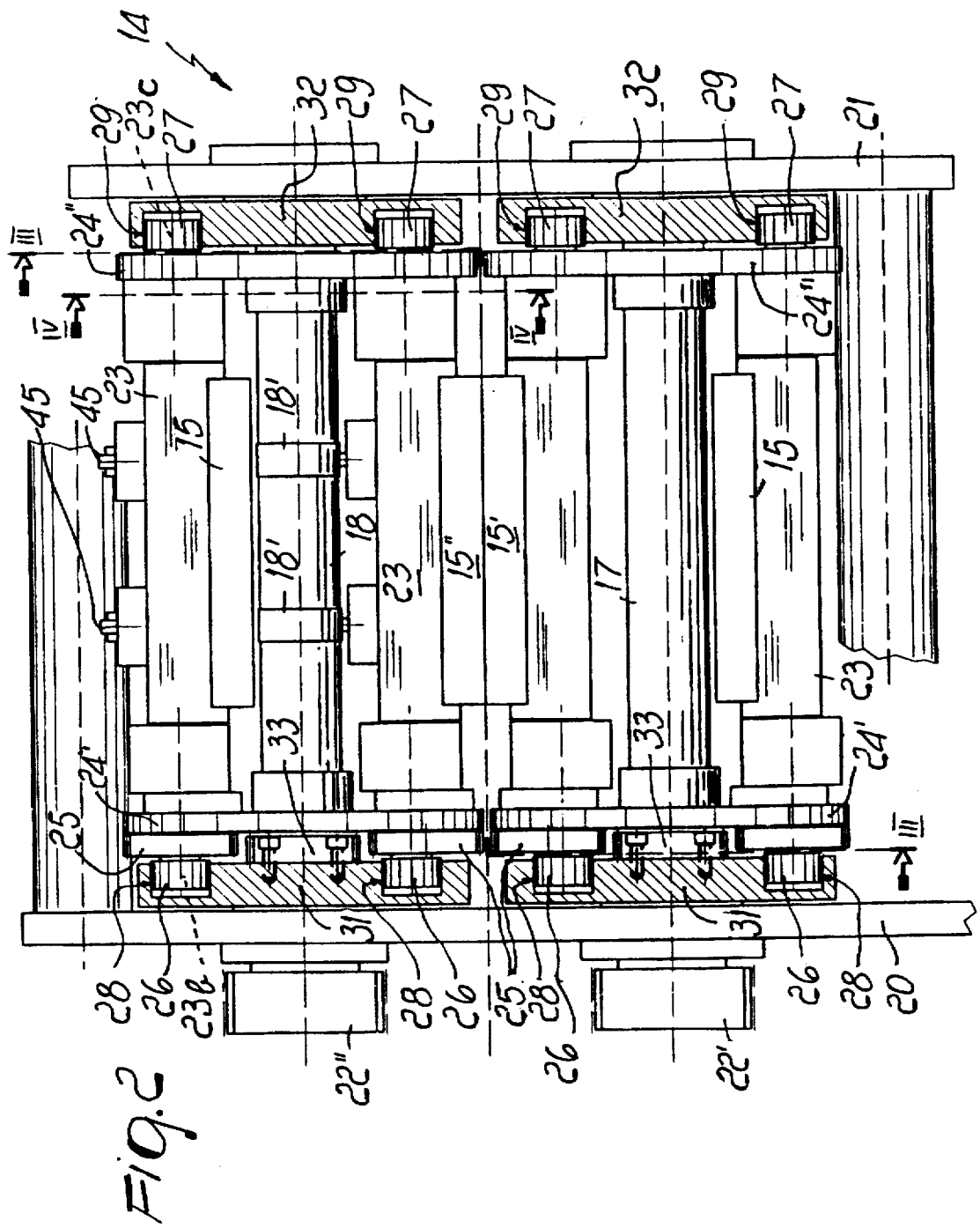
FIG. 2 is an enlarged-scale sectional view, taken along the plane II—II of FIG. 1, showing the heat-sealing and cutting device in detail.
Figure 3:
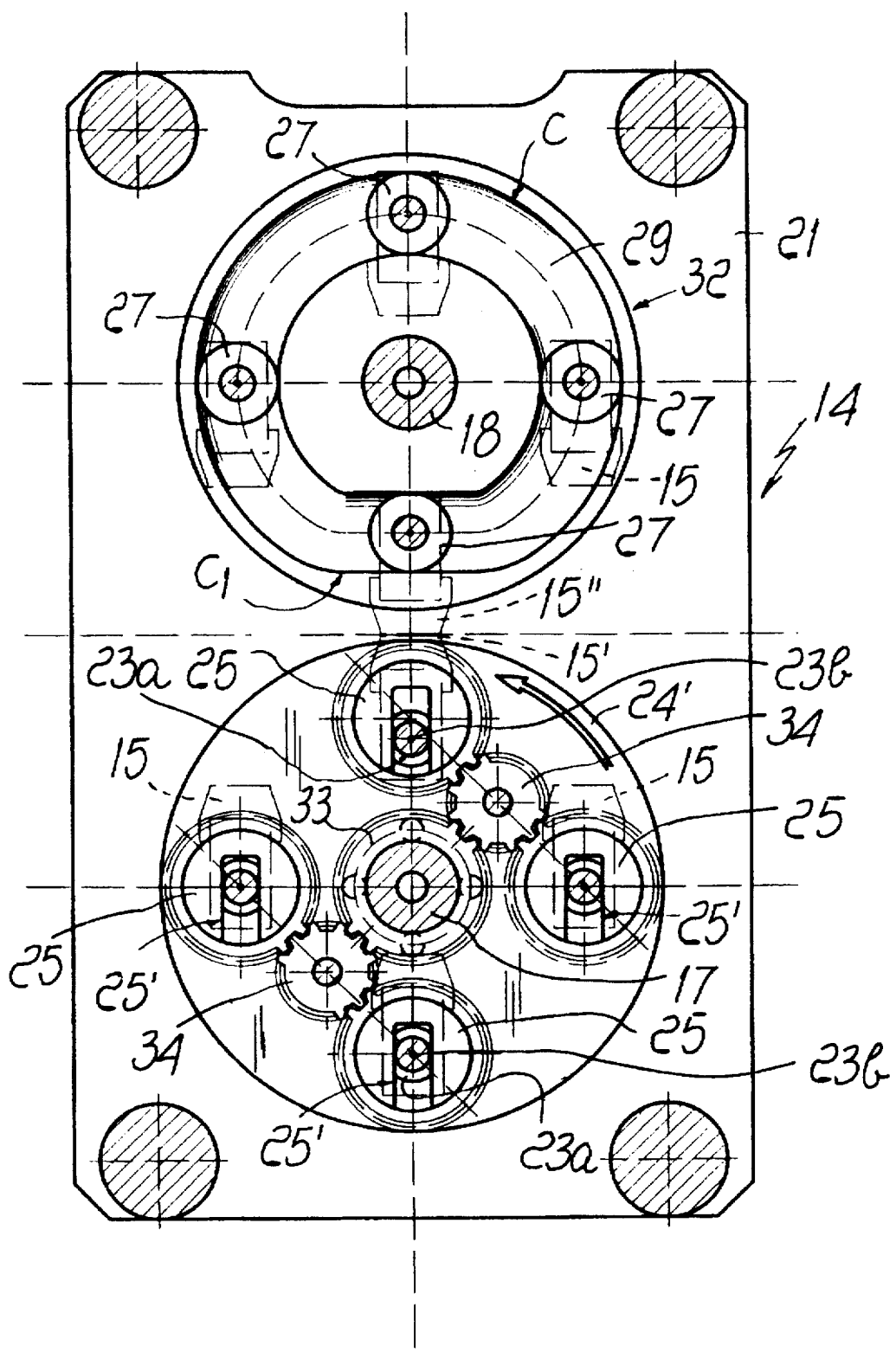
FIG. 3 is a sectional view, taken along the planes III—III of FIG. 2.
Figure 4:
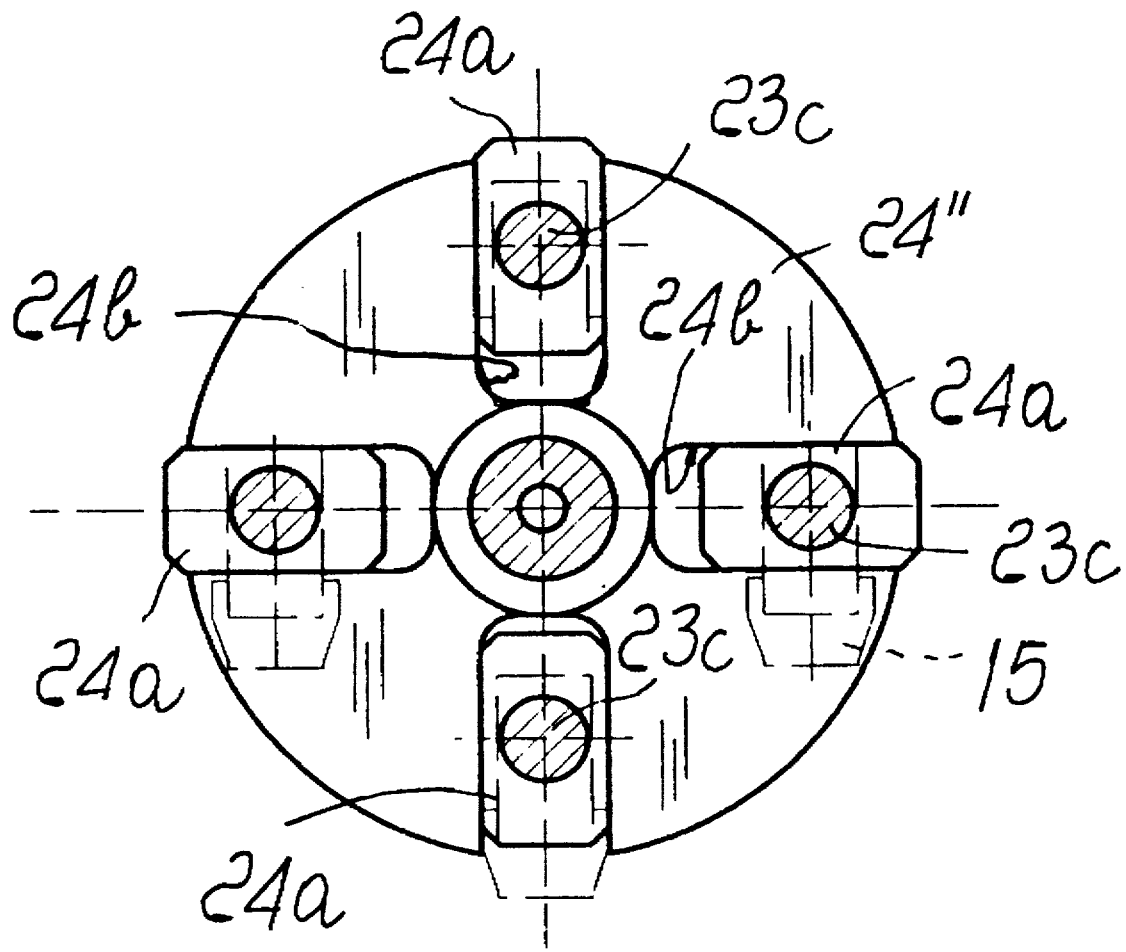
FIG. 4 is a partial sectional view, taken along the plane IV—IV of FIG. 2.

With reference to FIGS. 1 to 5, the reference numeral 10 generally designates a conventional heat-sealing machine with a horizontal path, which comprises a conveyor belt 11 that continuously feeds the products to be packaged (not shown), which are mutually spaced by an appropriate interval, for example an interval between 100 and 150 mm. The machine 10 is provided with conventional means, not shown, that are adapted to form a tubular container 12 made of heat-sealable polymeric material that is obtained starting from a sheet FO of said material, for example polyethylene, which is continuously fed from a reel as shown in the FIG. 1. The tubular container 12, which moves in the feed direction of the arrow F in the figure, contains the products to be packaged, which are separated from each other as specified above, and a heat-sealing and cutting device 14, according to a preferred aspect of the invention, is provided at the output end of the machine to perform, in the regions that separate one product from the next, the heat sealing and cutting of the container 12, so as to separate each individual packaged product from the adjacent one.

For this purpose, the device 14 uses mutually opposite heat-sealing and cutting active heads 15, which are associated with respective counter-rotating driving shafts 17-18 that are supported, so that they can rotate freely, by fixed plates 20 and 21 and are actuated, with the same angular speed, by a motor (not shown) by means of a belt with a double set of teeth and respective driven toothed pulleys 22'-22" that are engaged in an S-shaped fashion by said belt. Each active head 15 is rigidly coupled to a respective cross-member 23, and each cross-member 23 is supported by a pair of oppositely arranged disks 24'-24" that are rigidly coupled to the respective driving shafts 17-18.

Each disk 24' (which is arranged on the left with reference to FIG. 2) is provided with at least one pair of planetary gears 25 (FIGS. 1-6), preferably two pairs arranged at 90° to each other (FIG. 2); the planetary gears 25 are mounted so that they can rotate freely, and the end of a corresponding cross-member 23 for supporting an active head 15 is torsionally connected to each one of the planetary gears. More precisely, the end of the cross-member 23 rotates rigidly with the respective planetary gear 25 but can move radially with respect to it; for this purpose, each gear is provided with a slot 25' in which the prismatic portion 23a, having parallel faces, of a tip pivot 23b of the cross-member 23 slidingly engages.

An additional pivot 23c, provided at the other end of the cross-member 23, extends beyond the second disk 24" and passes, so that it can rotate, in the hole of a respective slider 24a that can slide in a corresponding radial slot 24b (FIG. 4) of the second disk 24". The two tip pivots 23b-23c of each cross-member 23 are provided with respective rollers 26-27 that engage in recessed tracks 28-29 of corresponding fixed cams 31-32 that are rigidly coupled to the corresponding fixed plates 21-22 of the device 14.

In a per se known manner, the tracks 28-29 of the pair of cams 31-32 have a circular portion C that is concentric to the respective driving shaft 17-18 and a straight portion C1 that is parallel to the direction of the translatory motion of the tubular container 12. Each one of the cams 31 adjacent to the disks 24' provided with the planetary gears 25 supports a respective fixed sun gear 33 that is arranged coaxially to the corresponding driving shaft 17-18 and around which the planetary gears 25 rotate without meshing. Idler gears 34 are interposed between each sun gear 33 and the corresponding planetary gears 25; both the sun gear and the planetary gears have the same pitch diameter. The set of gears 25 and 33-34 forms a planetary-gear system by means of which, when the disk 24' rotates rigidly with its shaft (17 or 18), the idler gears 34 roll on the fixed sun gear 33, turning the gears 25, which rotate relative to the disk 24'; the rotary motion of the gears 25 relative to the disk 24' is termed "revolving motion" in the present description.

By virtue of the 1:1 transmission ratio of the planetary-gear system, each planetary gear 25 performs a revolution about its own axis that is equal to the rotation that the disk performs about the axis of its own shaft (17–18), so that the active heads 15 move together with the disk 24 but remain parallel to themselves, as shown in dashed lines in the figures. Accordingly, and in accordance with the stated aim and objects, the approach of two mutually opposite active heads such as 15'–15" (FIG. 3), associated with the respective shafts 17 and 18, occurs without relative rotations but by straight translatory motions of the heads along an approach path that lies at right angles to the path of the tubular container 12.

Correspondingly, when the rollers 26-27 of each cross-member 23 engage the straight portion C1 of the tracks of the cams 31–32, the mutually opposite heads 15'–15" make contact with each other, and contact occurs on all of the active surface of the heads right from the initial moment of the contact and continues throughout the straight portion C1 of the cam tracks.

In a per se known manner, during the mutual contact stage, the mutually opposite heads 15'–15 " clamp the tubular container 12 and, by means of the activation of heating means (not shown) that are associated with the heads, produce the heat-sealing of the container in the space that lies between one product and the next. The heads also cut the container in the heat-sealed region, producing the separation of each product from the adjacent and subsequent one.

Figure 5A:
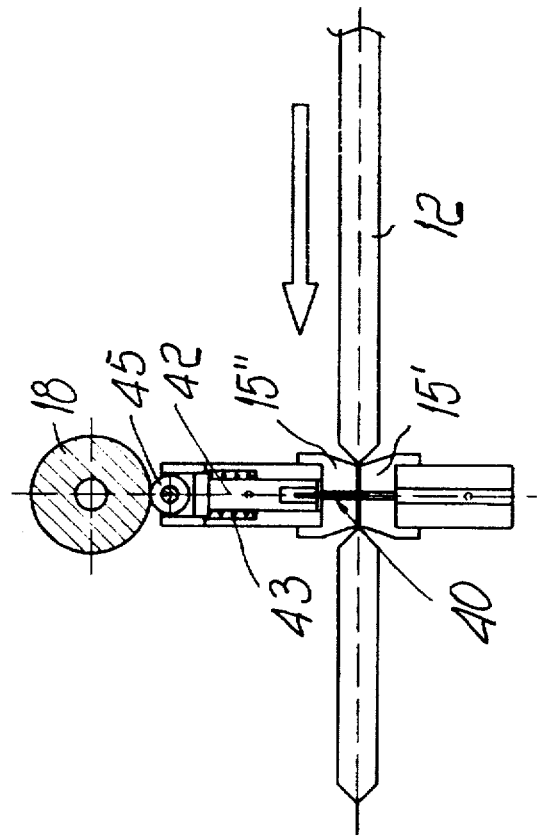
FIG. 5a is a sectional view, similar to FIG. 5, illustrating the cutting means of the active heads in the active cutting position.
Figure 5:
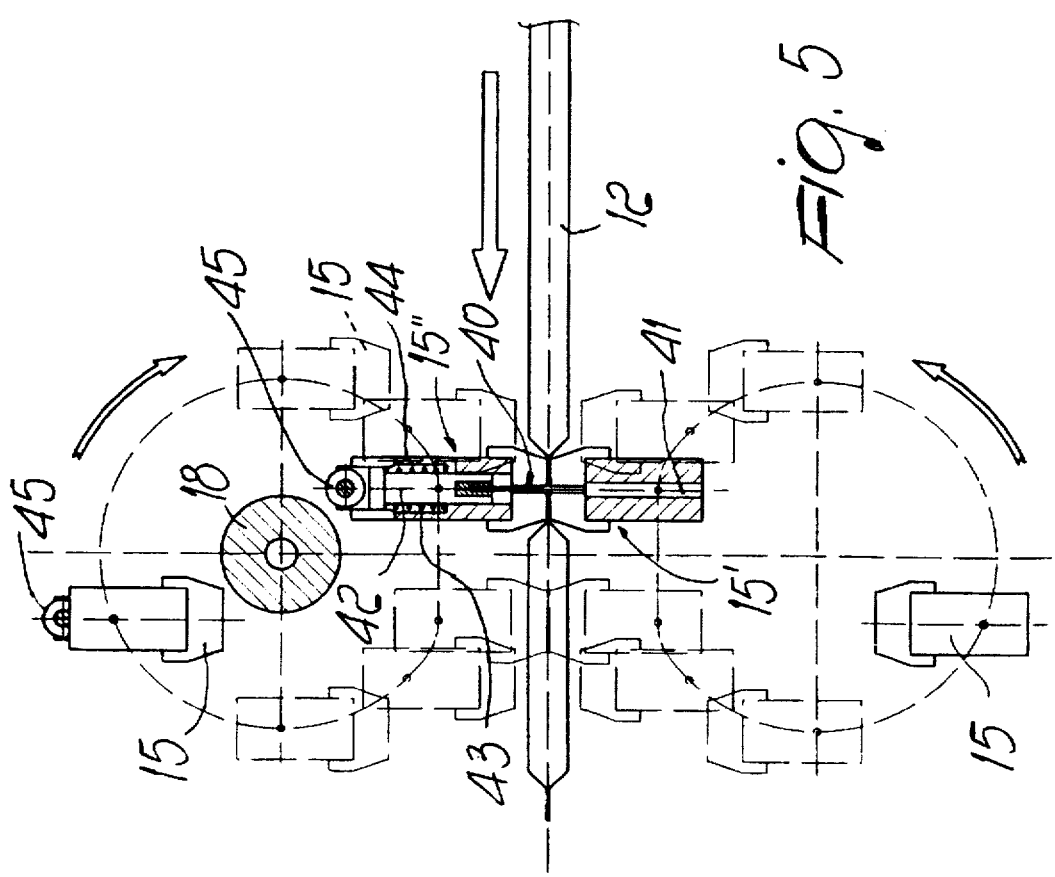
FIG. 5 is a schematic sectional view, illustrating the cutting means that are associated with the active heads of the heat-sealing and cutting device of FIG. 2, said means being shown in the inactive configuration.

For this purpose (FIGS. 5—5a), each one of the heads 15" associated with one of the two driving shafts, for example with the shaft 18, is provided with a cutting blade 40, and the mutually opposite heads 15', associated with the other driving shaft, for example the shaft 17, are provided with a seat 41 for accommodating the blade (or vice versa). The blade 40 is supported by sliding members 42; each sliding member is slideable, in contrast with the action of a return spring 43, in a corresponding guiding and retention housing 44 that is rigidly coupled to the active head 15". The free end of each sliding member is provided with a respective tappet roller 45 that is capable of interfering with a corresponding collar 18' of the shaft 18; the roller is engaged by the collar to cause the lowering of the blade and the cutting of the heat-sealed portion of the container 12 when the sliding member 42 is aligned with the axis of the shaft 18 (FIG. 5a).

Figure 6:
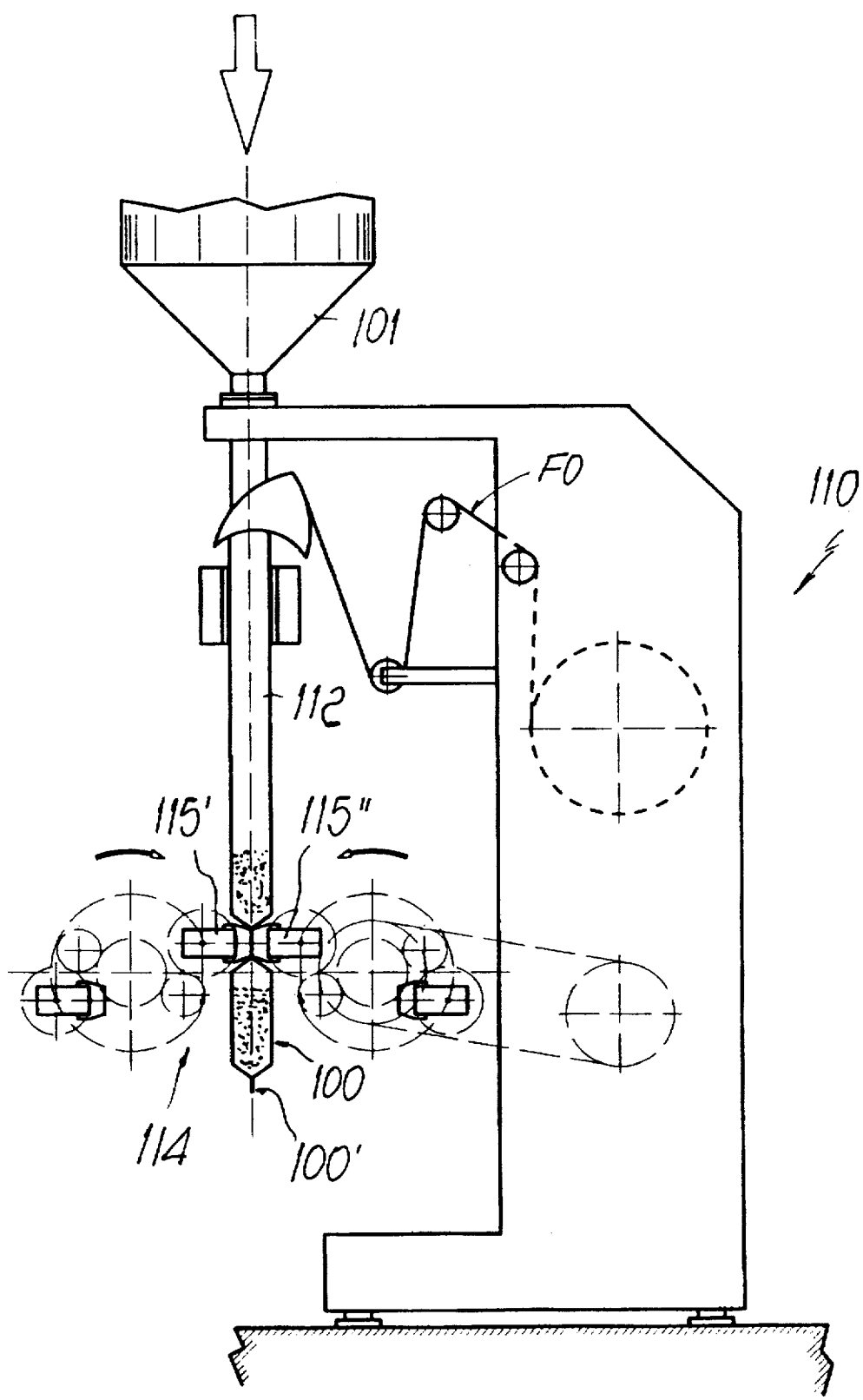
FIG. 6 is a schematic lateral elevation view of a machine having a vertical path provided with the heat-sealing and cutting device of the preceding figures.

FIG. 6 illustrates a heat-sealing and cutting device as described above, applied to a heat-sealing machine 110 in which the tubular container 112 moves along a vertical path. In this machine, the heat-sealing and cutting device, generally designated by the reference numeral 114, forms heat-sealed pouch-like packages 100 that contain, for example powdered products fed by a controlled hopper 101 to the machine 110.

As clearly shown in the figure, the active heads 115'–15", by moving mutually closer in the described manner, close by heat-sealing each package 100 into which the dose of powdered product has been fed, and separate each sealed package 100 by cutting, simultaneously forming the heat-sealed bottom 100' of the next package. The mutual approach of the active heads along a path at right angles to the tubular container 112 ensures the perfect and quick production of the pouch-like package 100, preventing any seepage of the powdered product between the heat-sealed flaps of the container.

Without altering the concept of the invention, the details of execution and the embodiments may of course be altered extensively with respect to what is described and illustrated by way of non-limitative example.

In particular, in small machines, the planetary-gear system may be provided without the aid of the idler gears 34 by making the planetary gears 25 mesh directly with the respective sun gear 33.

This embodiment and others are possible without abandoning the scope of the present invention, which is defined by the following claims.

What is claimed is:

1. A device for the continuous heat-sealing of packaging containers made of heat-sealable polymeric material, comprising mutually opposite active heads that are associated with respective counter-rotating driving shafts and are subjected to the action of cam elements for moving said heads along a path that is partially parallel to a continuous tubular container that includes the products to be packaged and in which the oppositely arranged active heads, during the rotation of the respective counter-rotating driving shafts, move mutually closer to clamp the tubular container in the region that separates one product from the other, to perform the heat-sealing of said region and the cutting of the container that separates each package from the adjacent one; and a planetary-gear system that is interposed between the active heads and the corresponding driving shaft and is adapted to make the individual heads, during the rotation of said driving shaft, perform a revolving motion that keeps them parallel to each other, said system being also adapted to cause the mutual approach of the mutually opposite heads that are associated with each of the counter-rotating shafts, in a mutually parallel relationship along an approach path that is substantially perpendicular to said tubular container, said planetary-gear system comprises a sun gear that is fixed with respect to the driving shaft and at least one plurality of planetary gears that are supported, so that they can rotate freely, by a supporting disk that is rigidly coupled to said driving shaft, such that each planetary gear rotates rigidly with a respective cross-member that is provided with a corresponding active head, the device further comprising additional idler gears interposed between the sun gear and the planetary gears and meshing with both; said idler gears being supported, so that they can rotate freely, by said supporting disk so as to roll on the sun gear when the corresponding driving shaft rotates about its own axis, each one of said planetary gears being provided with a slot in which a prismatic end of the corresponding cross-member for supporting the active head engages torsionally but so that it can slide radially.

2. A device according to claim 1, wherein each cross-member that supports an active head is supported by two supporting disks, one of which is provided with the planetary gears and with the idler gears, and in that the ends of the cross-member extend so as to form respective tip pivots that protrude beyond the supporting disks and are provided with respective rollers that engage in corresponding recessed tracks of said cam elements.

3. A device according to claim 2, wherein said cam elements are constituted by a pair of fixed plates, each of which is provided with a corresponding recessed track that is composed of a circular portion and of a straight portion, and in that one plate of each pair supports the sun gear of the corresponding planetary-gear system so that it is rigidly coupled and arranged concentrically to the circular portion of the respective track.

4. A device according to claim 1, wherein the active heads associated with a driving shaft include heating means and a cutting blade and the mutually opposite active heads that are associated with the other counter-rotating driving shaft include heating means and a seat for accommodating said cutting blade.

5. A device according to claim 4, wherein the cutting blade is supported by sliding members that can slide in corresponding housings of the active head, and in that the members are provided with respective tappet rollers that can interfere with the driving shaft to produce the lowering of the cutting blade when the members are aligned with the axis of said shaft.

6. A machine for the heat-sealing of containers for packaging individual products, especially food products, obtained starting from a continuous tubular container containing said products, which are appropriately spaced, including a heat-sealing and cutting device according to claim 1.

7. A machine according to claim 6, wherein the tubular container is provided with a substantially horizontal advancement.

8. A machine according to claim 6, wherein the tubular container is provided with a substantially vertical advancement and further comprising a controlled hopper for feeding individual doses of powdered products in the containers.

9. A heat-sealing device for heat-sealing packaging containers made of heat-sealable material, comprising:

an area for receiving a succession of heat sealable containers;

counter-rotating shaft means including a pair of counter-rotating shafts arranged mutually opposite to said area for receiving a succession of heat sealable containers;

means for driving said counter-rotating shaft means;

active head means associated with said counter-rotating shaft means for being moved into heat sealing association with containers at said area for receiving the containers; and planetary-gear system means interposed between said active head means and said counter-rotating shaft means for moving said active head means into said heat sealing association with said containers, said planetary gear means being provided with a slot for torsionally enagaging said active head means while allowing a radial sliding of said active head means.

* * * * *